United States Patent [19]

Mangas et al.

[11] Patent Number: 5,033,585
[45] Date of Patent: Jul. 23, 1991

[54] DEVICE FOR CONTROLLING LUBRICANT FLOW

[75] Inventors: Claude R. Mangas, Sartrouville; Gérard Truyen, Pressagny l'Orgueilleux, both of France

[73] Assignee: Societe Anonyme Dite Hispano Suiza, Saint Cloud Cedex, France

[21] Appl. No.: 550,633

[22] Filed: Jul. 10, 1990

[30] Foreign Application Priority Data

Jul. 12, 1989 [FR] France ................. 89 09370

[51] Int. Cl.⁵ ............................. F16N 27/00
[52] U.S. Cl. ............................. 184/7.4; 184/6.12; 464/7
[58] Field of Search ............. 464/7, 16; 184/6, 6.11, 184/6.12, 6.26, 7.4

[56] References Cited

U.S. PATENT DOCUMENTS 2,911,267 11/1959 Small, Jr. ..................... 184/6.26
3,326,423 6/1967 Clark ............................. 184/6

Primary Examiner—Ira S. Lazarus
Assistant Examiner—Alan B. Cariaso
Attorney, Agent, or Firm—Bacon & Thomas

[57] ABSTRACT

Disclosed is a device for controlling the flow of lubricant oil through an axial passage of a rotating shaft in which the flow of lubricant is not solely dependent upon a nozzle output. The device includes a member extending generally transversely across the axial passage and located downstream of the stationary nozzle. The member has an inner side facing the axial passage and an outer side facing the lubricant nozzle. The member, which also defines an internal cavity, has an intake opening defined through the outer side to enable the oil emanating from the nozzle to pass into the cavity. The member also has a discharge orifice extending through the inner side and communicating with the cavity to enable the lubricant to exit the cavity and enter the axial passage. An evacuation opening is formed through the outer side to control the amount of oil retained in the cavity. The discharge orifice is located a greater radial distance from the center line of the rotating shaft than is the evacuation opening. The location of the evacuation opening acts as a level control for the lubricant within the cavity.

18 Claims, 2 Drawing Sheets

DEVICE FOR CONTROLLING LUBRICANT FLOW

BACKGROUND OF THE INVENTION

The present invention relates to a device for controlling the lubricant flow through an axial passage in a rotating shaft.

It is well-known in the art to supply a lubricating oil to various components of mechanical assemblies through an axial passage extending through a rotating shaft. Typically, the lubricating oil is sprayed from a nozzle located in a stationary part of the apparatus adjacent to one end of the axial passage. The oil forms a thin layer on the interior of the axial passage and progresses axially along the passage as the shaft rotates. Radial orifices are defined in the shaft at locations in which it is desired to provide lubricating oil to parts of the assembly attached to, or located adjacent to the rotating shaft. Centrifugal force urges the lubricating oil outwardly through the radial orifices onto the elements to be lubricated. Typical examples of such known mechanisms are shown in U.S. Pat. Nos. 2,712,976 to Sutton; 4,013,141 to James; 3,589,471 to Edge; and 3,621,937 to Edge et al.

Although these known lubricating systems have proven generally satisfactory, the lubricant flow is determined solely by the output of the stationary nozzle. In order to supply sufficient lubricant to all of the radial orifices, it may be necessary to provide an undesirable excess of lubricant to some of the orifices. This results in a waste of lubricant.

Attempts have been made to alleviate this problem as exemplified in U.S. Pat. No. 2,874,803 to Gunberg. The lubricating means disclosed by Gunberg allows the lubricant to flow into the shaft through apertures formed in the shaft. However, to a large extent, the flow of lubricant in the shaft remains essentially dependent upon the nozzle output.

SUMMARY OF THE INVENTION

The present invention relates to a device for controlling the flow of lubricant oil through an axial passage of a rotating shaft in which the flow of lubricant is not solely dependent upon a nozzle output. The device includes a member extending generally transversely across the axial passage and located downstream of the stationary nozzle. The member has an inner side facing the axial passage and an outer side facing the lubricant nozzle. The member, which also defines an internal cavity, has an intake opening defined through the outer side to enable the oil emanating from the nozzle to pass into the cavity. The member also has a discharge orifice extending through the inner side and communicating with the cavity to enable the lubricant to exit the cavity and enter the axial passage. An evacuation opening is formed through the outer side to control the amount of oil retained in the cavity.

The discharge orifice is located a greater radial distance from the center line of the rotating shaft than is the evacuation opening. Tus, when the level of the lubricant in the cavity reaches the level of the evacuation opening, it flows through the opening to the upstream side of the outer surface. The location of the evacuation opening acts as a level control for the lubricant within the cavity.

As the control member rotates with the shaft, the intake opening passes in front of the lubricating nozzle, which may be located off-center with respect to the axis of the rotating shaft, to permit a certain amount of lubricant to enter the cavity during each revolution. Due to centrifugal forces, the lubricant spreads uniformally on the periphery of the cavity. When the lubricant accumulating in the cavity reaches a level corresponding to the position of the discharge orifice, it passes through the orifice and into the axial passage in the shaft. The excess oil in the cavity is returned to the nozzle side of the control member through the evacuation opening. Accordingly, the relative positions of the discharge orifice, and the evacuation opening act as an accurate control of the lubricant passing through the discharge orifice and into the axial passage. The control is a function of the cross-section of the discharge orifice and the relative radial distance between the discharge orifice, and the evacuation opening. The rotational speed of the shaft is also a factor in the control of the lubricant flow. Thus, the lubricant flow into the axial passage is substantially independent of the pressure differential on either side of the control device.

BRIEF DESCRIPTION OF THE DRAWINGS

FIG. 5 is a partial, front view of the alternative embodiment viewed in the direction of arrow A in FIG. 4.

DETAILED DESCRIPTION OF THE PREFERRED EMBODIMENT

Figure 1:
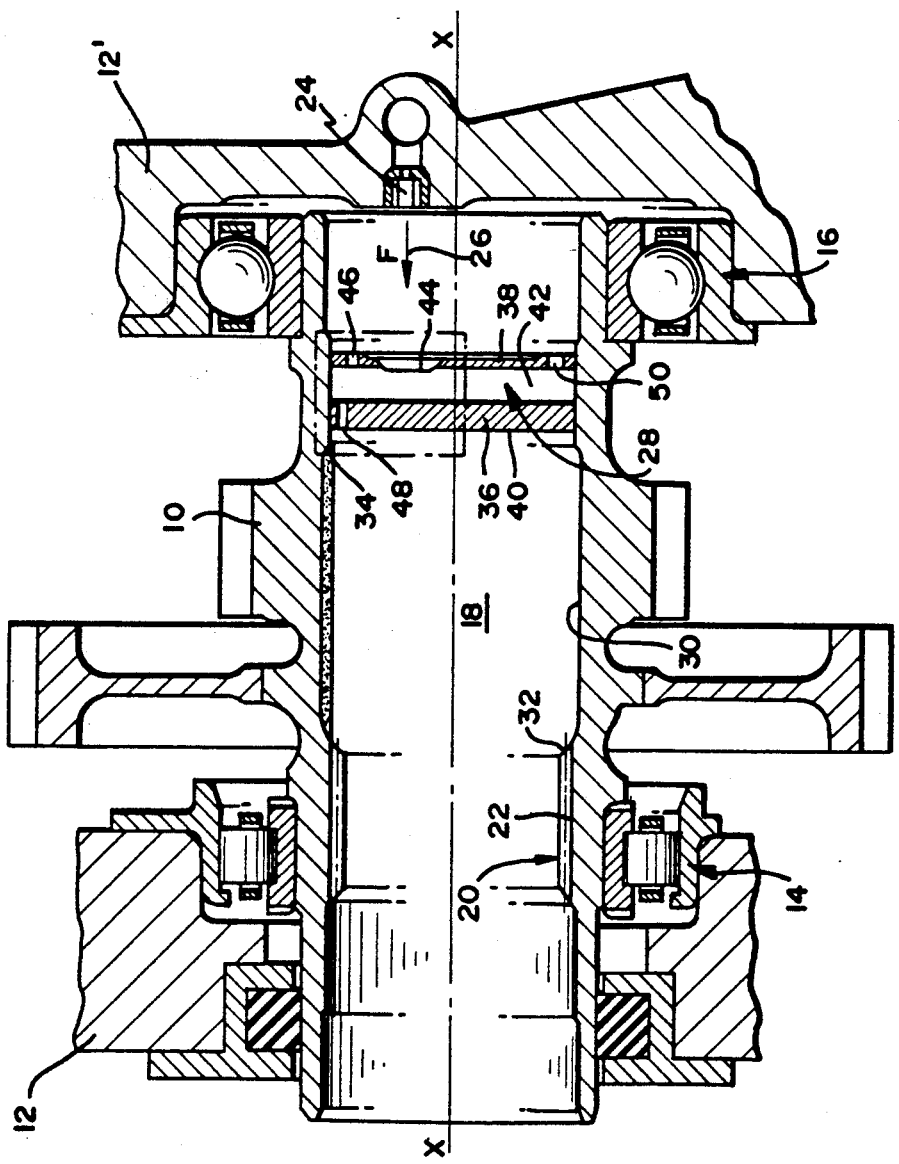
FIG. 1 is a longitudianal cross-sectional view of a rotating shaft incorporating the control device according to the invention.

As best illustrated in FIG. 1, the control device 28 according to the present invention fits in an axial passage 18 within a rotatable shaft 10 which has a longitudinal axis x—x about which the shaft rotates. The shaft is supported in a casing 12—12' via bearings 14 and 16 as is well-known in the art.

An axial passage 18 is defined by the interior of the shaft 10 and is continuous throughout the length of the shaft. The axial passage 18, which may also serve other functions, serves as a flow path for a lubricating liquid to lubricate components mechanically associated with the shaft 10. A segment 20 which defines splines 22 may extend into the axial passage 18 in order to mesh with a drive shaft (not shown) extending into the axial passage 18 from the left of FIG. 1.

The lubricating liquid is provided through stationary nozzle 24 which is mounted in the casing portion 12' and is supplied with lubricating liquid via any known means. The nozzle 24 sprays a jet 26 of lubricant into axial passage 18 in the direction arrow F. The nozzle 24 may be eccentrically located with respect to the longitudinal axis x—x, as shown in FIG. 1, or may be co-axial with the axis.

The flow control device 28 is located in the axial passage 18 and extends transversely across the axis passage generally perpendicular to the longitudinal axis x—x. The interior of the axial passage 18 defines a widened section 30 to form an accumulation and feeding zone for the lubricating oil. The widened section 30 extends between two dams formed at the ends of the widened section, illustrated at 32 and 34 in FIG. 1. In a known manner, once the lubricating liquid exits the flow control device 28, it will be spread by centrifugal force on the periphery of the widened section 30 and will flow along the shaft 10 in an axial direction when its level exceeds that of the downstream dam 32.

In the known, conventional devices, nozzle 24 sprays the lubricating fluid directly toward the widened section 30 formed on the axial passage 18. The flow of lubricant from the nozzle is controlled with great difficulty and, in order to supply sufficient lubricating fluid to all parts of the shaft 10, it is necessary to supply excess lubricant through the nozzle.

Figure 2:
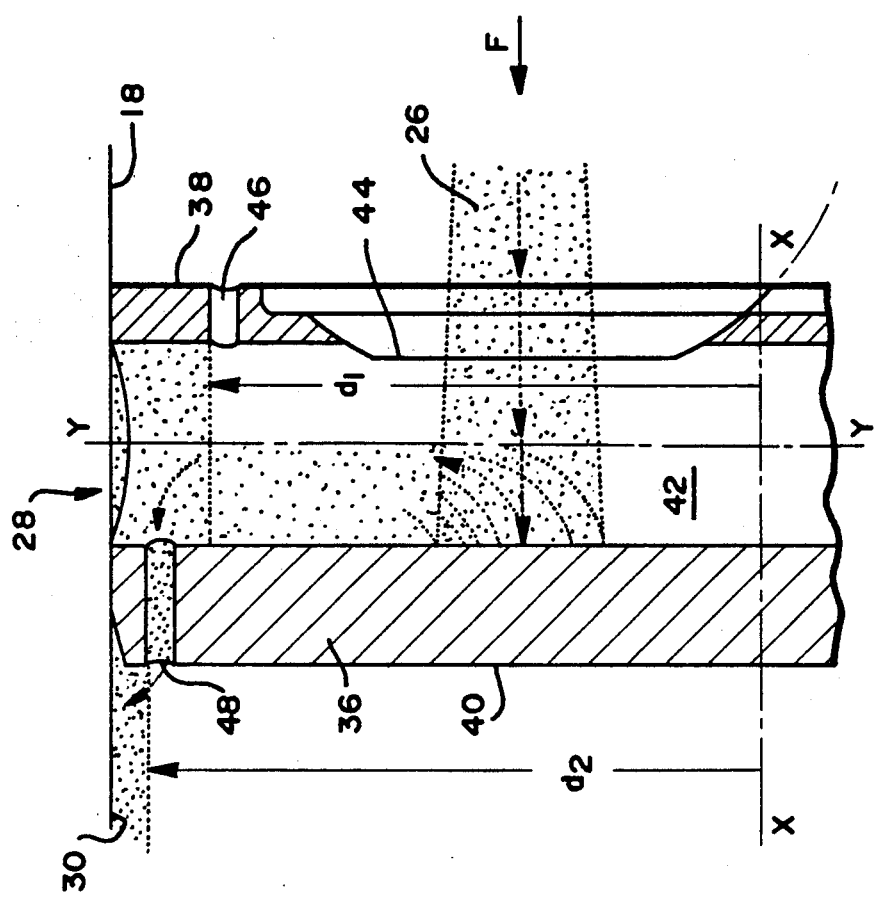
FIG. 2 is a partial, longitudinal cross-sectional view of the control device according to the invention.
Figure 3:
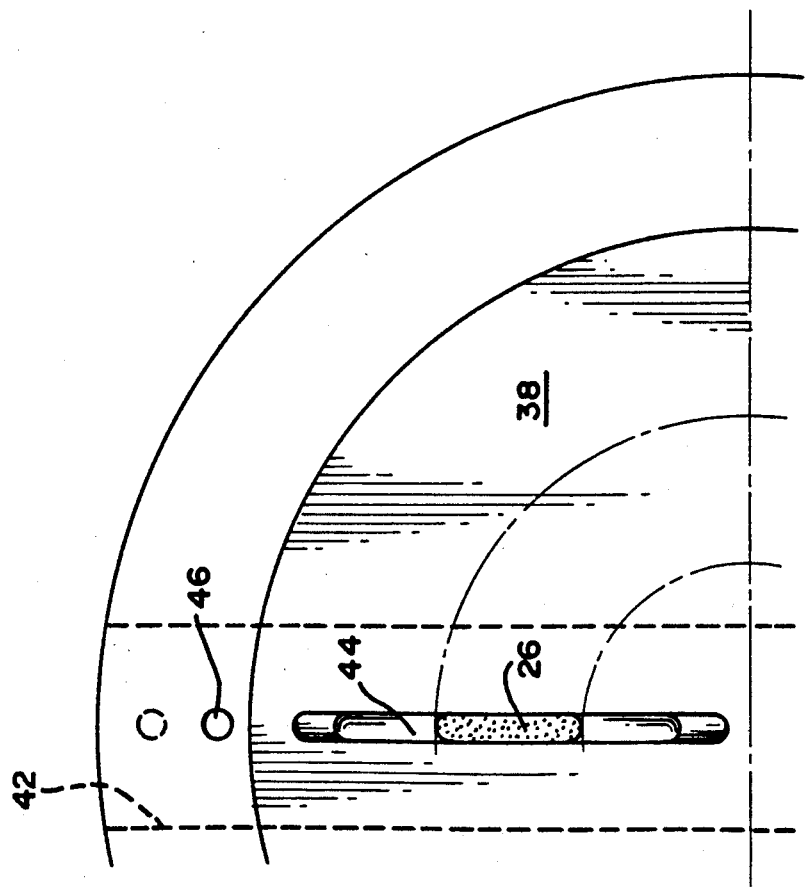
FIG. 3 is a partial, elevational view of the control device illustrated in FIG. 2.

The flow control device 28 according to the invention is shown in detail in FIGS. 2 and 3. The device 28 comprises a member 36 transversely mounted in the passage 18 so as to extend completely across this passage generally perpendicular to the axis x—x of shaft 10. The member 36 is located between the nozzle 24 and the widened portion 30 and has an outer side 38 facing the nozzle 24 and an inner side 40 facing the interior of the axial passage 18. A cavity 42 is defined internally in the member 36. In the embodiment illustrated in FIGS. 1-3, the cavity 42 has a generally cylindrical form with its longitudinal axis y—y extending generally perpendicular to the longitudinal axis x—x of shaft 10. The cavity 42 may have a generally circular cross-section as illustrated in the figures.

An intake opening 44 is defined through the outer surface 38 so as to communicate with cavity 42. As shown in FIG. 3, intake opening 44 may have the configuration of an elongated, generally radially extending slot. During each revolution of the shaft 10, the intake opening 44 passes through the spray of lubricant 26 thereby enabling a certain amount of lubricant to pass into the cavity 42. Centrifugal force acting on the lubricant causes it to pass radially outwardly toward the opposite ends of cavity 42. An evacuation opening 46 is also defined through the outer side 38 of the member 36. A discharge orifice 48 is defined through the inner side 40 of the member 36. Both the evacuation orifice 46 and the discharge orifice 48 communicate with cavity 42. As best seen in FIGS. 2 and 3, the evacuation opening 46 and the discharge orifice 48 may have generally circular cross-sections and may extend generally parallel to each other in a direction generally parallel to the longitudinal axis x—x of shaft 10. As best seen in FIG. 2, the evacuation opening 46 is located a distance $d_1$ from the longitudinal axis of the shaft, while the discharge orifice 48 is located a radial distance of $d_2$ from axis x—x. The location of these elements are such that $d_2$ is greater than $d_1$. The cross-sectional area of the discharge orifice 48 is relatively small such that lubricant forced toward the ends cavity 42 by the centrifugal force will accumulate until it reaches the level of the evacuation opening 46. Further accumulation of lubricant is prohibited, since any excess passes through the relatively larger evacuation opening 46 toward the outer side 38 of member 36.

The flow of lubricant through the discharge orifice 48 is a function of the rotational speed of the shaft 10; the cross-sectional area and the length of the discharge orifice 48; as well as the relative distance between the discharge orifice 48 and the evacuation opening 46. These parameters can be adjusted for a specific application and the amount of lubricant flowing through the discharge orifice 48 may be accurately controlled.

As best seen in FIG. 1, the outer surface 38 of member 36 may also define a second evacuation opening 50 generally located diametrically opposite from the evacuation opening 46. The second evacuation opening 50 prevents the lubricant from accumulating in this end of the cavity 42 and keeps this amount of lubricant substantially equal to that accumulating in the opposite end. This assures that the rotation of shaft 10 is in good balance. It is also well within the skill of the art to form member 36 such that it is also rotationally balanced.

The control device according to the invention assures control of the lubricant flow that is virtually independent of the pressure differential on either side of the member 36. The lubricant flow is insured even if the pressure acting on inner surface 40 exceeds that acting on outer surface 38.

It is quite evident that certain features of the control device could be varied without exceeding the scope of this invention. Such variations may include locating the intake opening 44 co-axially with the axis of rotation x—x; providing more than one intake opening 44, which multiple intake openings may be regularly distributed about the longitudinal axis x—x; and providing a plurality of discharge orifices 48 and/or evacuation openings 50 regularly distributed about the axis x—x.

Figure 4:
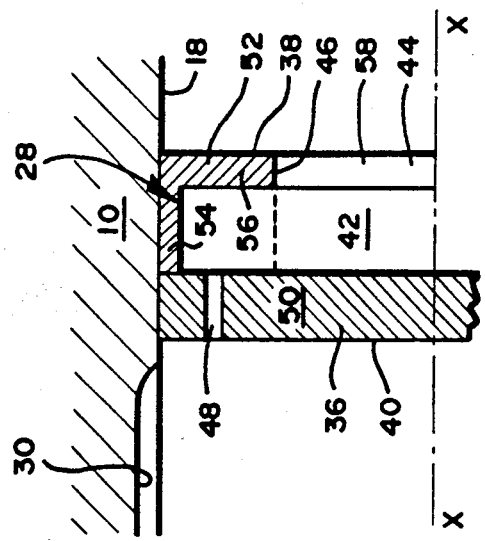
FIG. 4 is a partial, cross-sectional view of an alternative embodiment of the control device according to the invention.

An alternative construction of the control device is illustrated in FIG. 4 wherein the cavity 42 is formed as a volume of revolution about the longitudinal axis x—x. The member 36 is formed by a first portion 50, comprising a substantially flat disk, and second portion having a generally "U" shaped cross-section. The second portion comprises a generally radially extending flange portion 52 and a generally cylindrical rim portion 54 which may abut against the flat disk 50. Flange 52 has an inwardly facing radial rim 56 defining a generally circular hole 58 which functions as the intake opening 44. The radial rim 56 also functions as the evacuation orifice to control the level of lubricant building up around the circumference of the cavity 42. As in the previous embodiment, flat disk 50 defines the discharge orifice 48.

The foregoing description is provide illustrative purposes only and should not be construed as in any way limiting this invention, the scope of which is define solely by the appended claims.

We claim:

1. A device for controlling the flow of lubricant through an axial passage of a rotating shaft wherein the lubricant is sprayed into the passage through a nozzle comprising:
    a) a member extending generally transversely to a longitudinal axis of the rotating shaft across the axial passage downstream of the nozzle, the member defining an inner side facing the axial passage and an outer side facing the lubricant nozzle;
    b) a cavity defined by the member;
    c) at least one intake opening defined by the outer side of the member communicating with the cavity so as to allow lubricant to enter the cavity;
    d) at least one evacuation opening defined by the outer side of the member and communicating with the cavity, the evacuation opening located a distance $d_1$, from the longitudinal axis of the rotating shaft; and
    e) at least one discharge orifice defined by the inner side and communicating with the cavity so as to allow lubricant to exit the cavity, the discharge orifice located a distance $d_2$ from the longitudinal axis of the rotating shaft such that $d_2 > d_1$ wherein the at least one discharge orifice extends generally parallel to the at least one evacuation opening.

2. The device according to claim 1 wherein the at least one evacuation opening has a generally circular cross-sectional configuration.

3. The device according to claim 1 wherein the cavity has a generally cylindrical configuration with an axis of revolution extending generally transverse to the longitudinal axis of the rotating shaft.

4. The device according to claim 1 wherein the member comprises:
 a) a first, substantially flat disk portion defining the at least one discharge orifice; and,
 b) a second portion having a generally "U" shaped cross-sectional shape such that the cavity is defined between the first and second portions, the second portion defining the at least one intake opening and the evacuation means.

5. The device according to claim 1 wherein the at least one intake opening has an elongated slot configuration.

6. The device according to claim 5 wherein the elongated slot extends generally perpendicular to the longitudinal axis of the rotating shaft.

7. The device according to claim 1 wherein the at least one discharge orifice has a generally circular cross-sectional configuration.

8. The device according to claim 1 wherein the at least one intake opening has a generally circular configuration.

9. The device according to claim 8 wherein a central axis of the generally circular intake opening is generally coincident with the longitudinal axis of the rotating shaft.

10. The device according to claim 8 wherein the member has an edge portion defining the generally circular intake opening; the edge portion also defining the evacuation means.

11. A device for controlling the flow of lubricant through an axial passage of a rotating shaft wherein the lubricant is sprayed into the passage through a nozzle comprising:
 a) a member extending generally transversely to a longitudinal axis of the rotating shaft across the axial passage downstream of the nozzle, the member defining an inner side facing the axial passage and an outer side facing the lubricant nozzle;
 b) a cavity defined by the member;
 c) at least one intake opening having an elongated slot configuration defined by the outer side of the member communicating with the cavity so as to allow lubricant to enter the cavity;
 d) evacuation means defined by the outer side of the member and communicating with the cavity, the evacuation means located a distance $d_1$, from the longitudinal axis of the rotating shaft; and
 e) at least one discharge orifice defined by the inner side and communicating with the cavity so as to allow lubricant to exit the cavity, the discharge orifice located a distance $d_2$ from the longitudinal axis of the rotating shaft such that $d_2 > d_1$.

12. The device according to claim 11 wherein the evacuation means comprises at least one evacuation opening defined by the outer side.

13. The device according to claim 12 wherein at least one evacuation opening extends generally parallel to the at least one discharge orifice.

14. The device according to claim 12 wherein the at least one evacuation opening has a generally circular cross-sectional configuration.

15. The device according to claim 11 wherein the cavity has a generally cylindrical configuration with an axis of revolution extending generally transverse to the longitudinal axis of the rotating shaft.

16. The device according to claim 11 wherein the member comprises:
 a) a first, substantially flat disk portion defining the at least one discharge orifice; and,
 b) a second portion having a generally "U" shaped cross-sectional shape such that the cavity is defined between the first and second portions, the second portion defining the at least one intake opening and evacuation means.

17. The device according to claim 11 wherein the elongated slot extends generally perpendicular to the longitudinal axis of the rotating shaft.

18. The device according to claim 11 wherein the at least one discharge orifice has a generally circular cross-sectional configuration.

* * * * *